C. W. MADSEN.
COFFEE ROASTER.

No. 179,419.  Patented July 4, 1876.

Attest:
Wm. Bagger
C. A. Snow.

Inventor:
Carl Wilhelm Madsen,
by Louis Bagger
his Atty.

UNITED STATES PATENT OFFICE.

CARL W. MADSEN, OF CHICAGO, ILLINOIS.

IMPROVEMENT IN COFFEE-ROASTERS.

Specification forming part of Letters Patent No. 179,419, dated July 4, 1876; application filed April 21, 1876.

*To all whom it may concern:*

Be it known that I, CARL WILHELM MADSEN, of Chicago, in the county of Cook and State of Illinois, have invented certain new and useful Improvements in Coffee-Roasters; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
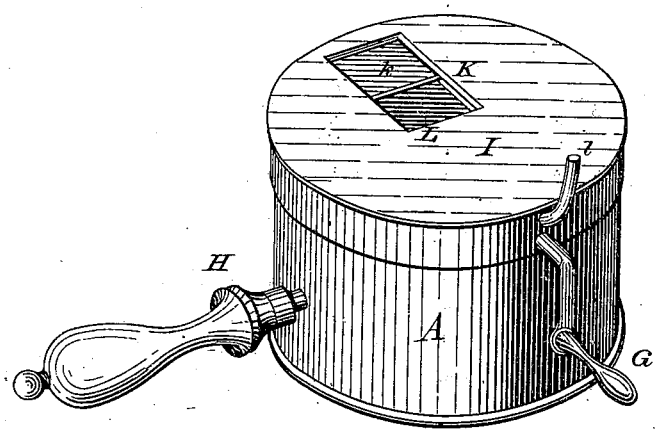
Figure 2:
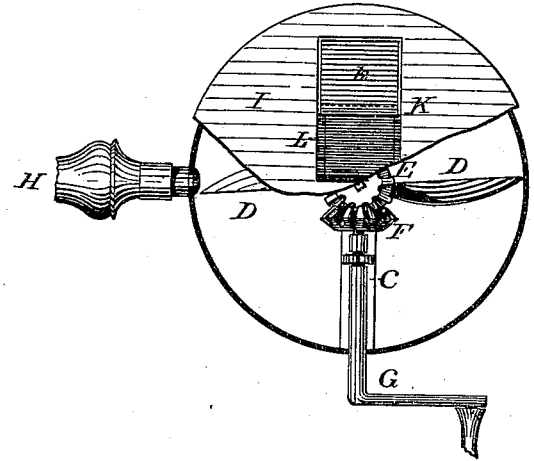
Figure 3:
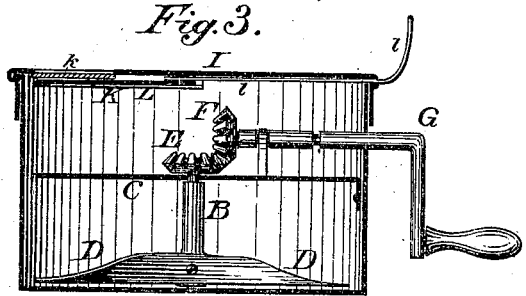

Figure 1 is a perspective view. Fig. 2 is a top view, the cover being removed; and Fig. 3 is a section after the line $x\ x$ in Fig. 2.

Similar letters of reference indicate corresponding parts in all the figures.

This invention relates to machines for roasting coffee, and is more especially designed for family use where only small quantities have to be roasted at a time. Its construction and operation are hereinafter more fully described.

In the drawing, A is a deep box or pan, made of sheet metal, and, preferably, circular in shape. In the middle of the bottom of this box is pivoted an axle, B, which has its other bearing in the diametrical brace C. Upon axle B are affixed two shovel-blades or stirrers, D D, by which the coffee is stirred, so as to prevent it from scorching. Axle B has a pinion, E, engaging with a similar pinion, F, upon shaft or crank G, by which the rotating device is operated. H is a handle, by which the box may be shaken when necessary. Box A has a removable, but closely-fitting, cover, I. In cover I is an opening, K, which is partly closed by a glass pane, $k$. Below opening K and pane $k$ is a metallic slide, L, operated by a handle, $l$, as shown. The object of this opening is to enable the operator to ascertain the state of the coffee while being roasted.

The metallic slide prevents the glass from cracking by the heat, and it may, if necessary, be totally withdrawn, so as to admit air into the box.

The operation of my improved roasting-machine will be readily understood from the foregoing description.

When the coffee is placed in box A this is placed over the fire, and the coffee (to prevent it from burning) is continually stirred by the operator by means of the shovel-blades D D and their operating device. Air may be admitted into the pan, and the steam of the coffee be allowed to escape by withdrawing the slide L, while the contents of the pan may be inspected from time to time through the glass pane $k$ by partly withdrawing the protecting sliding plate L.

Having thus described my invention, I claim and desire by Letters Patent—

1. The coffee-roaster herein described, consisting of the pan A, having upright axle B, shovel-shaped stirrers D D, and operated by the crank G, in combination with the closely-fitting cover I, having opening K, glass pane $k$, and sliding plate L, all combined and operated substantially as and for the purpose herein set forth.

2. In a coffee-roaster, the cover I, having an opening, K, partly covered by a glass pane, $k$, in combination with the sliding plate L, combined and operated substantially as and for the purpose hereinbefore set forth.

In testimony that I claim the foregoing as my own I have hereto affixed my signature in presence of two witnesses.

CARL WILHELM MADSEN.

Witnesses:
 H. BROWN,
 KNUD STEINLOPZ.